US007491341B2

(12) United States Patent
Kelly et al.

(10) Patent No.: US 7,491,341 B2
(45) Date of Patent: Feb. 17, 2009

(54) METHOD OF MAKING TAPERED CAPILLARY TIPS WITH CONSTANT INNER DIAMETERS

(75) Inventors: Ryan T. Kelly, West Richland, WA (US); Jason S. Page, Kennewick, WA (US); Keqi Tang, Richland, WA (US); Richard D. Smith, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 397 days.

(21) Appl. No.: 11/394,840

(22) Filed: Mar. 31, 2006

(65) Prior Publication Data

US 2007/0235408 A1 Oct. 11, 2007

(51) Int. Cl.
*C03C 25/68* (2006.01)
*B44C 1/22* (2006.01)

(52) U.S. Cl. ............................ 216/11; 216/83; 216/96; 216/97; 216/100; 216/108; 216/109

(58) Field of Classification Search .................... 216/11
See application file for complete search history.

(56) References Cited

U.S. PATENT DOCUMENTS

| | | | | |
|---|---|---|---|---|
| 4,445,751 A * | 5/1984 | Divens et al. | 385/43 |
| 4,469,554 A | 9/1984 | Turner | |
| 5,290,398 A * | 3/1994 | Feldman et al. | 216/11 |
| 5,709,803 A * | 1/1998 | Filas et al. | 216/11 |
| 5,772,903 A * | 6/1998 | Hirsch | 216/11 |
| 5,788,166 A | 8/1998 | Valaskovic et al. | |
| 5,800,666 A * | 9/1998 | Bonham et al. | 156/345.15 |
| 5,985,166 A | 11/1999 | Unger et al. | |
| 6,670,607 B2 | 12/2003 | Wood et al. | |
| 7,060,975 B2 | 6/2006 | Seaward et al. | |
| 7,132,054 B1 * | 11/2006 | Kravitz et al. | 216/11 |
| 7,261,827 B2 * | 8/2007 | Ootsu et al. | 216/7 |
| 7,262,068 B2 * | 8/2007 | Roy et al. | 438/48 |
| 2002/0020688 A1 * | 2/2002 | Sherman et al. | 216/2 |
| 2003/0141392 A1 | 7/2003 | Nilsson et al. | |
| 2004/0245457 A1 | 12/2004 | Granger et al. | |
| 2005/0133713 A1 | 6/2005 | Brennen | |
| 2006/0022131 A1 | 2/2006 | Tojo | |

OTHER PUBLICATIONS

Lambelet, P. et al "Chemically etched fiber tips for near-field optical microscopy: a process for smoother tips" Appl. Optics 37(31) 7289-92, Nov. 1, 1998.*

Stockle, et al., High-Quality near-field optical probes by tube etching, Applied Physics Letters, Jul. 12, 1999, vol. 75, pp. 160-162.

(Continued)

*Primary Examiner*—Anita K Alanko
(74) *Attorney, Agent, or Firm*—Allan C. Tuan

(57) ABSTRACT

Methods of forming electrospray ionization emitter tips are disclosed herein. In one embodiment, an end portion of a capillary tube can be immersed into an etchant, wherein the etchant forms a concave meniscus on the outer surface of the capillary. Variable etching rates in the meniscus can cause an external taper to form. While etching the outer surface of the capillary wall, a fluid can be flowed through the interior of the capillary tube. Etching continues until the immersed portion of the capillary tube is completely etched away.

10 Claims, 4 Drawing Sheets

OTHER PUBLICATIONS

Haber, et al., Shape control of near-field probes using dynamic meniscus ethching, Journal of Microscopy, vol. 214, p. 27, Apr. 2004, Issue 1.

Barnidge et al., Rapid Communications in Mass Spectrometry, 1999, p. 994-1002, 13, no month available.

Barnidge et al., Anal. Chem., 1999, p. 4115-4118, 71, no month available.

Trapp et al., Electrophoresis, 2005, p. 1358-1365, 26, no month available.

Ivanov et al., Electrophoresis, 2003, p. 3663-3673, 24, no month available.

Koerner et al., Anal. Chem., 2004, p. 6456-6460, 76, no month available.

Website for Optimal Online Analysis Silica Tips, and Taper Tips. http://222.newobjective.com/products/tips_online_tips.html, no date available.

U.S. Appl. No. 11/346,799, filed Feb. 2, 2006.

Wong, et al., Journal of Microelectromechanical Systems, vol. 13 No. 6 Dec. 2004, pp. 940-946.

* cited by examiner

METHOD OF MAKING TAPERED CAPILLARY TIPS WITH CONSTANT INNER DIAMETERS

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Electrospray ionization mass spectrometry (ESI-MS), especially at nanospray flow rates, has become very valuable for biological research because of its sensitivity and the ease with which it can be coupled with separation techniques such as liquid chromatography (LC). Typically, generating a stable electrospray at nanospray flow rates requires emitter tips with very small orifice diameters.

When fabricating the tips, both the inner and outer diameters can contribute significantly to the performance of the emitter tip at obtaining a stable nano-electrospray. Traditional methods for forming emitter tips can be associated with inner diameters that decrease along the length of the tip and/or with large outer diameters (i.e., blunt and/or thick walls) at the orifice. Thick walls at the orifice can adversely affect nanospray performance, and tapered inner diameters can contribute to clogging. Furthermore, many of the existing methods for forming emitter tips lack reproducibility and/or simplicity. Therefore, a need exists for a reproducible method of producing robust ESI emitter tips that are capable of nanospray and that resist clogging.

DESCRIPTION OF DRAWINGS

Embodiments of the invention are described below with reference to the following accompanying drawings.

DETAILED DESCRIPTION

Figures 1A, 1B, 1C:
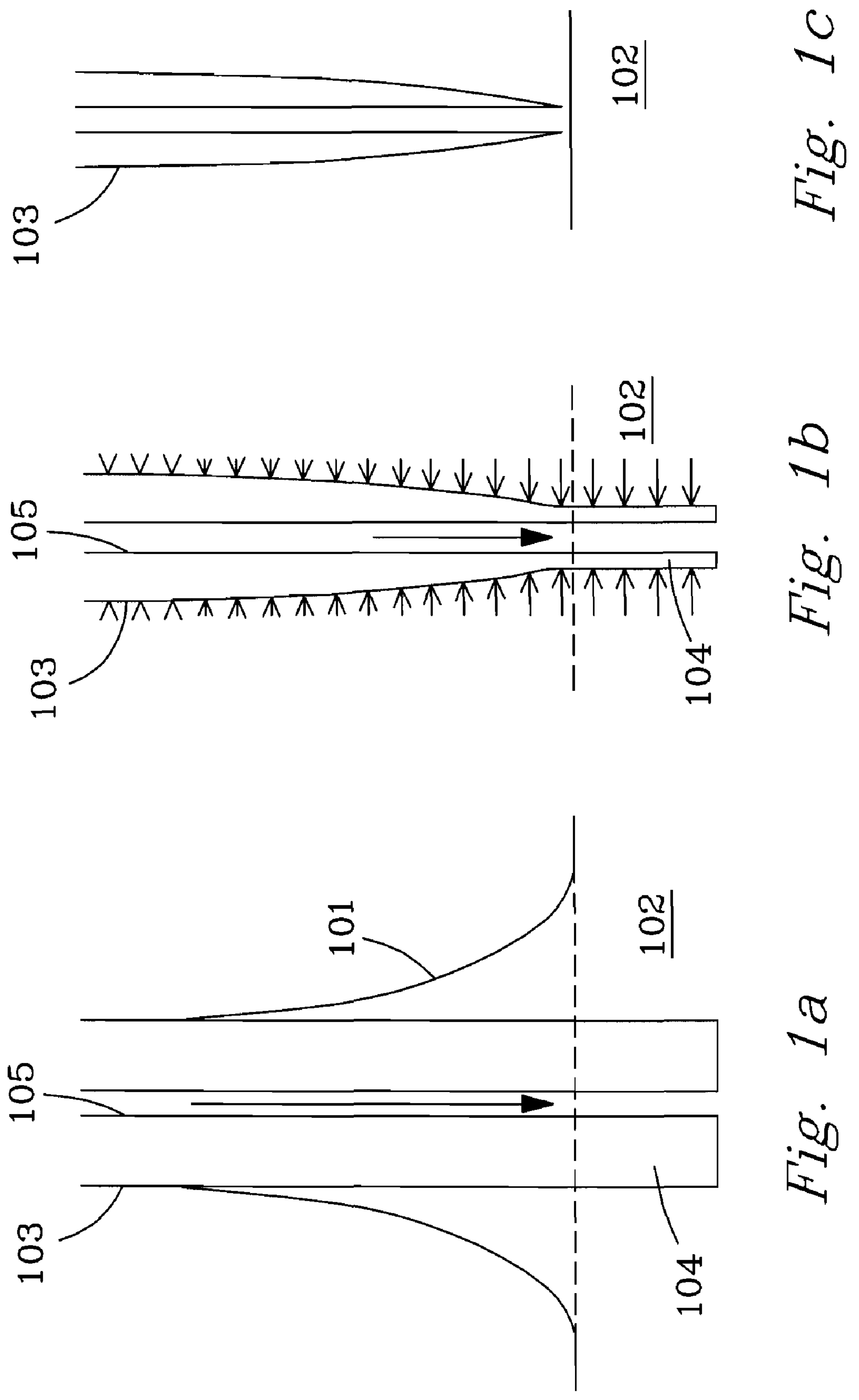
FIGS. 1$a$-1$c$ and 1$d$-1$f$ are illustrations of a capillary tube being etched to form a tapered tip, according to embodiments that involve empty capillaries and capillaries filled with a porous monolithic material, respectively.
Figure 1F:
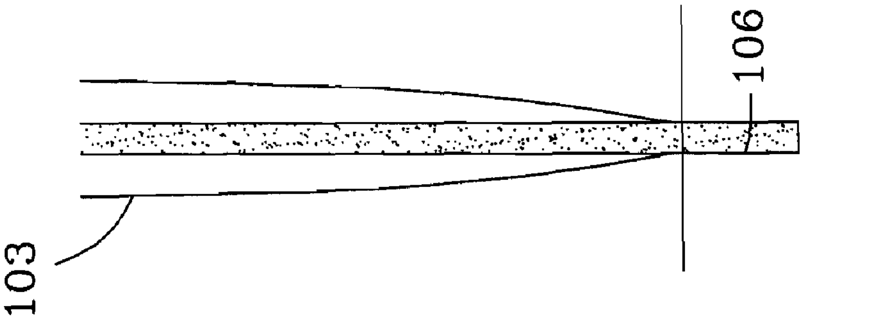
Figure 1E:
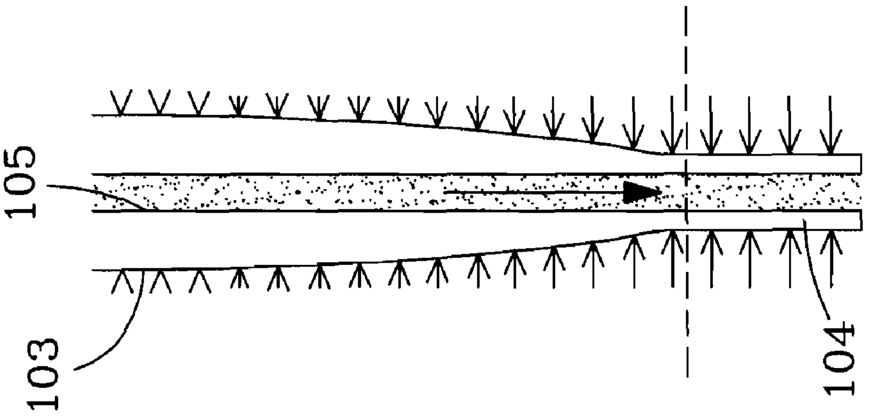
Figure 1D:
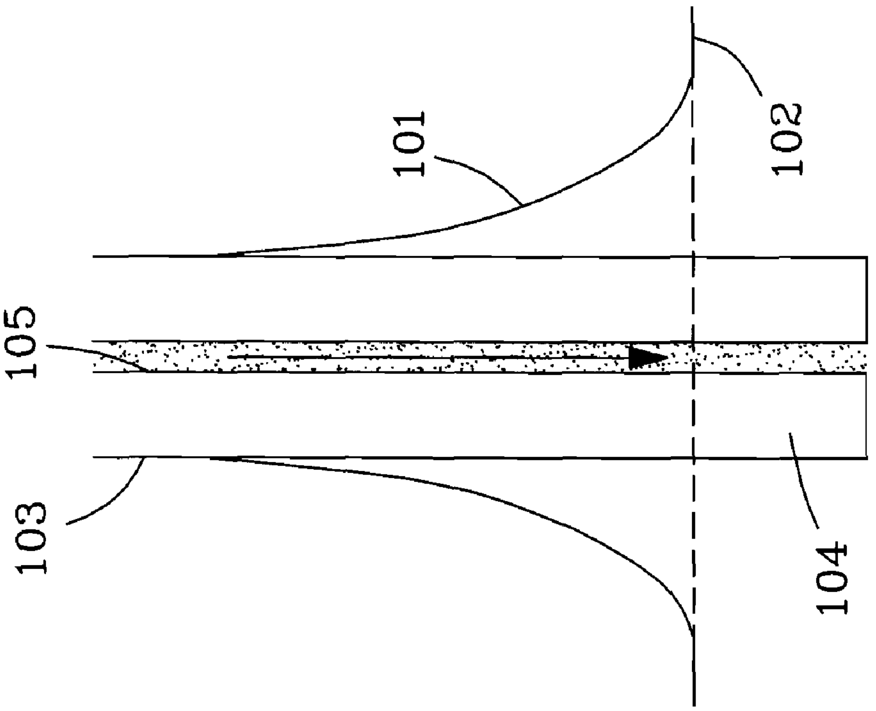

At least some aspects of the disclosure provide methods of forming a tapered tip on a capillary tube. For instance, in one embodiment, a portion of the capillary tube can be immersed into an etchant, wherein the etchant forms a concave meniscus on the outer surface of the capillary. While etching the outer surface of the capillary wall, a fluid can be flowed through the interior of the capillary tube. Etching continues until the immersed portion of the capillary tube is completely etched away. Accordingly, in the instant embodiment, the inner and outer diameters are substantially equal at the orifice. Exemplary forming can result in an ESI emitter tip having a substantially constant inner diameter and a tapered outer diameter. Details regarding such an ESI emitter tip are described in U.S. patent application Ser. No. 11/346,799, which details are incorporated herein by reference.

As used herein, a concave meniscus refers to a meniscus formed on a surface by a liquid when the adhesive forces are greater than the cohesive forces (i.e., the liquid wets the surface). In one example, water forms a concave meniscus on a glass surface.

The capillary tube can be made of an etchable material including, but not limited to, silica, stainless steel, and polymers. The etchant can comprise a substance effective in chemically removing material from the capillary tube at a substantially predictable rate. Examples can include, but are not limited to, hydrofluoric acid, nitric acid, sulfuric acid, hydrogen peroxide, and combinations thereof. The fluid that flows through the capillary tube can comprise a substance that does not etch or adversely react with the etchant. Examples of the fluid can include, but are not limited to, water, nitrogen gas, and combinations thereof.

FIGS. 1$a$-1$c$ and FIGS. 1$d$-1$f$ illustrate the etching of a capillary tube, shown in cross-section, to form a tapered tip according to embodiments that involve empty capillaries and capillaries filled with a porous monolithic material, respectively. Referring to FIG. 1$a$ (or FIG. 1$d$), a concave meniscus 101 can form on the outer surface of a capillary 103 that is partially immersed in an etchant 102. The dashed line represents the approximate level of the bulk etchant. Fluid flowing toward the etchant reservoir through the interior 105 of the capillary tube can prevent the etchant from etching the inner walls. Referring to FIG. 1$a$ (or FIG. 1$d$) and FIG. 1$b$ (or FIG. 1$e$), etching throughout the length of the immersed portion 104 of the capillary tube occurs at a substantially fixed and constant rate. Above the level of the etchant (i.e. above the dashed line), the decreasing amount and/or rate of etching results in a tapered outer diameter. According to FIG. 1$b$ (or FIG. 1$e$), the amount and/or rate of etching is represented by the length of the arrows. In one embodiment, as shown in FIG. 1$c$ (or FIG. 1$f$), etching proceeds until the immersed portion of the capillary tube is completely etched away and the tip physically separates from the liquid etchant. For capillary tubes that have been filled with a porous monolithic material, etching proceeds until the immersed portion of the capillary tube is completely etched away and the tip physically separates from the liquid etchant leaving a porous monolithic material tip 106 that protrudes beyond the end of capillary tube. Accordingly, in some embodiments, formation of the tapered tip can be self-regulating, resulting in high reproducibility between tips. Tapered tips fabricated according to the embodiments described herein can have an outer diameter that decreases continuously.

Figure 2A:
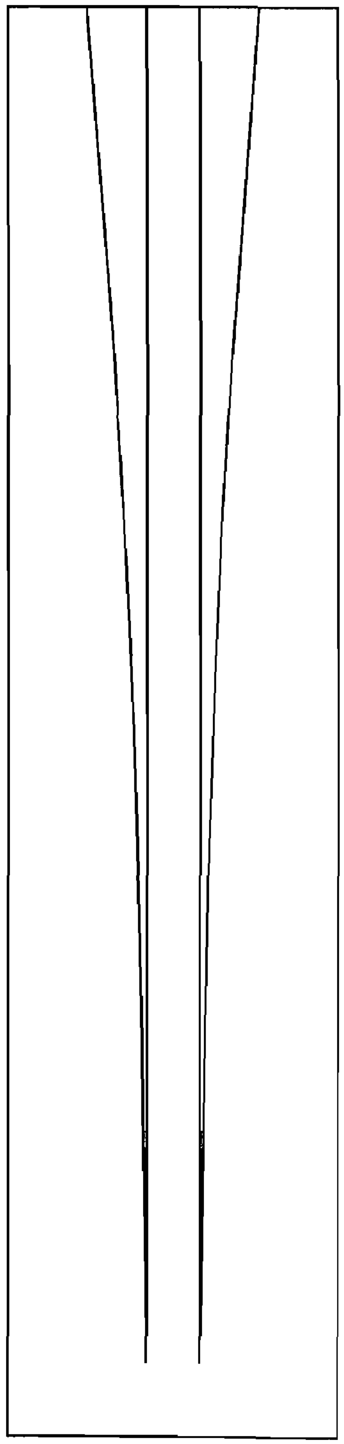
FIGS. 2$a$ and 2$b$ are illustrations of tapered tips with different taper angles.
Figure 2B:
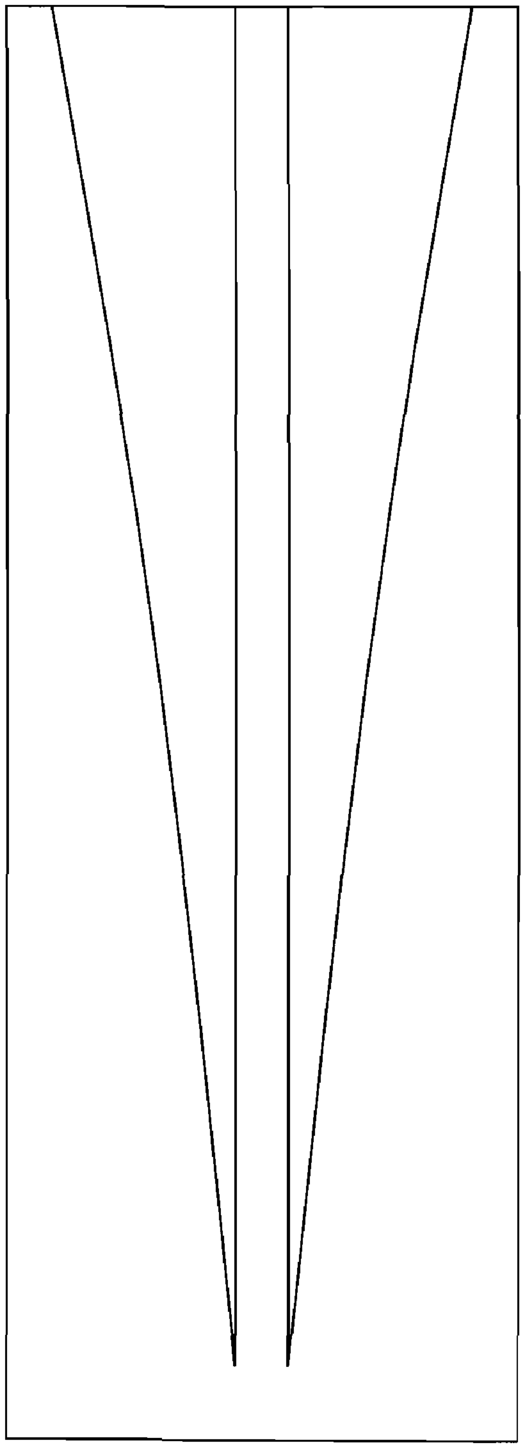

The angle of the taper can be varied, according to one embodiment, by selecting capillary tubes having various wall thicknesses and/or outer diameters. For example, capillary tubes with thicker walls can result in larger taper angles (i.e., the angle between the inner wall and the tapered outer wall). Referring to FIG. 2, two different etched capillaries are shown both of which have an inner diameter of approximately 10 μm. The capillary tube in FIG. 2$a$ had an initial outer diameter of approximately 150 μm, whereas that in FIG. 2$b$ had an initial outer diameter of approximately 360 μm. After etching under the same conditions, the taper angles were approximately 2 degrees and approximately 7 degrees, respectively. Alternatively, in other embodiments, the taper angle can be varied by selecting etchants with various viscosities and/or concentrations. In one embodiment, the taper angle is greater than or equal to approximately 2 degrees.

Figure 3:
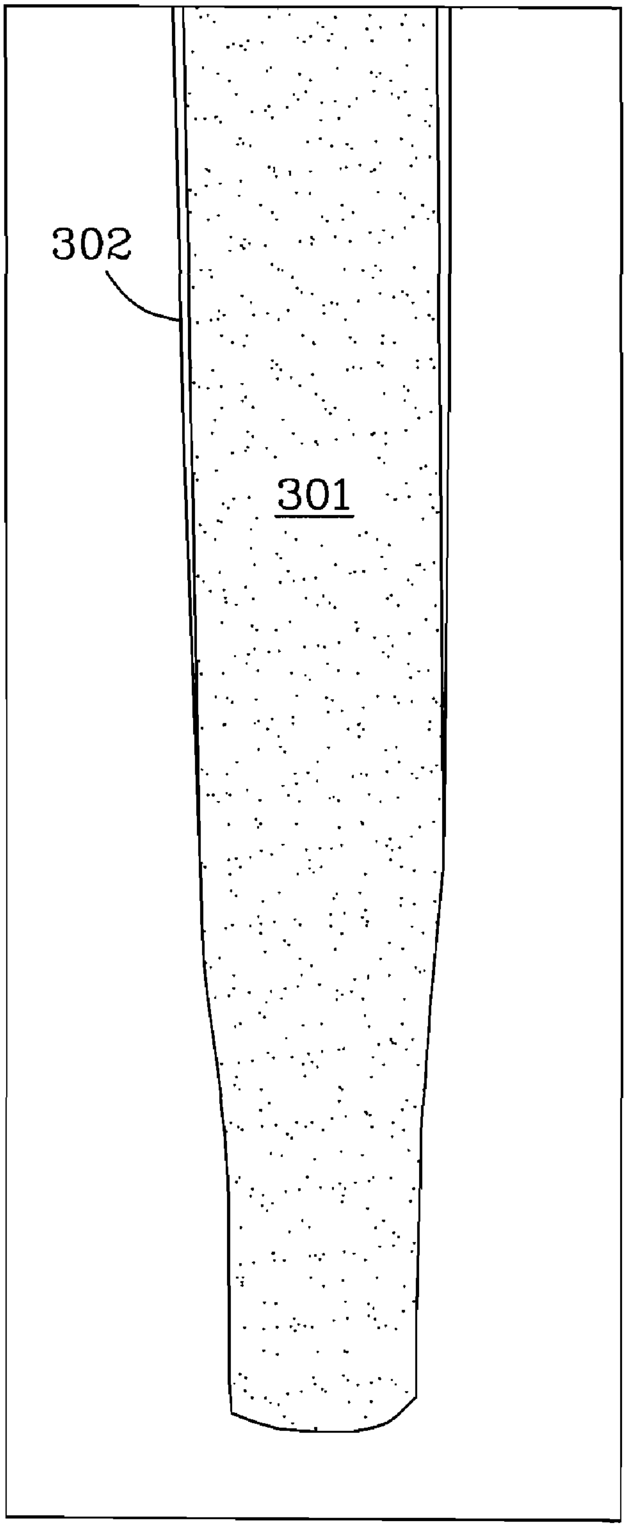
FIG. 3 is an illustration of a tapered tip filled with a porous monolithic material.

In some embodiments, the inner volume of the capillary tube can be filled with a porous monolithic material prior to immersing the capillary tube in the etchant. Examples of porous monolithic materials can include, but are not limited to, silica or a polymeric material. Furthermore, the porous monolithic material can be chemically modified for liquid chromatography separations applications. Referring to FIG. 3, a tapered tip 302 is shown wherein the inner volume of the capillary tube has been filled with a porous monolithic material 301. In a specific embodiment, the filled capillary tube having a tapered tip is an ESI emitter tip.

Example: Fabrication of ESI Emitter from Fused Silica Capillaries

The present example further describes and illustrates the methods described herein and should not limit the scope of the invention. According to the instant example, the polyimide coating is first burned and removed from the end ~1 cm of a fused silica capillary. A short length, approximately 1 mm, of the bare capillary is inserted into an approximately 49% aqueous hydrofluoric acid solution. Water is pumped through the capillary at a flow rate of approximately 0.1 μL/min, or less, using a syringe pump with a 250 μL syringe. A thin film of etchant forms along the hydrophilic capillary exterior above the bulk etchant solution surface. The applicants believe that the concentration of the etchant decreases through the resulting meniscus, as the molecules that react with the capillary near the bulk etchant level are unavailable to react at further distances along the capillary. This concentration gradient decreases the rate and/or amount of etching as a function of distance from the bulk solution, which creates the taper in the capillary o.d. Etching continues until the silica contacting the hydrofluoric acid reservoir is completely removed, thereby automatically stopping or substantially slowing the etching process. This "self-regulation" results in high reproducibility between each tip fabricated accordingly. Once etching is complete, the capillary is removed, rinsed in water, and ready for use.

The procedure described in the present example can also be performed on capillary tubes filled with a porous monolithic material to produce monolithic ESI emitters. In such an instance, rather than using an open tubular capillary, the capillary tube would be first filled with, for example, C18-modified mesoporous silica.

In some embodiments, production throughput of emitter tips can be increased by etching a plurality of capillary tubes in parallel. In a specific example, a syringe pump can be connected to a multi-port manifold via a transfer capillary. The manifold can split the flow of an inert fluid evenly between a plurality of transfer lines that are each connected to individual capillaries. The capillaries can then be immersed together into an etchant reservoir and carried out as described elsewhere herein.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method of forming a tapered tip on a capillary tube having an inner surface, an outer surface, an inner diameter, an outer diameter and an inner volume, the method comprising:

immersing a portion of the capillary tube into an etchant, wherein the etchant forms a concave meniscus on the outer surface of the capillary;

flowing a fluid through the inner diameter of the capillary tube while etching the capillary tube until the immersed portion is completely etched away;

wherein the inner diameter of the capillary tube is substantially constant and the outer diameter at the tip region is tapered.

2. The method as recited in claim 1, wherein the inner and outer diameters are substantially equal at the orifice.

3. The method as recited in claim 1, wherein the decrease in the outer diameter of the tapered tip is continuous.

4. The method as recited in claim 1, wherein the angle of the taper is determined by the initial capillary outer diameter, the thickness of the wall between inner and outer capillary diameters, or both.

5. The method as recited in claim 4, wherein the angle of the taper is greater than approximately 2 degrees.

6. The method as recited in claim 1, wherein the capillary tube comprises a material selected from the group consisting of silica, stainless steel, polymers and combinations thereof.

7. The method as recited in claim 1, further comprising filling the inner volume of the capillary tube with a porous monolithic material prior to immersing the capillary tube in the etchant.

8. The method as recited in claim 7, wherein the filled capillary tube having a tapered tip is an ESI emitter tip.

9. The method as recited in claim 1, wherein the fluid is selected from the group consisting of water, nitrogen gas, and combinations thereof.

10. The method as recited in claim 1, wherein the etchant comprises a liquid selected from the group consisting of hydrofluoric acid, nitric acid, sulfuric acid, hydrogen peroxide, and combinations thereof.

* * * * *

UNITED STATES PATENT AND TRADEMARK OFFICE
CERTIFICATE OF CORRECTION

PATENT NO. : 7,491,341 B2
APPLICATION NO. : 11/394840
DATED : February 17, 2009
INVENTOR(S) : R T Kelly et al.

It is certified that error appears in the above-identified patent and that said Letters Patent is hereby corrected as shown below:

Please correct paragraph 0001 of the application and Column 1, lines 8 through 11 of the issued patent as follows:

The invention was made with Government support under grant number RR018522 from the U.S. National Institutes of Health and contract DE-AC05-76RL01830 awarded by the US Department of Energy. The government has certain rights in the invention.

Signed and Sealed this
Eleventh Day of September, 2012

David J. Kappos
*Director of the United States Patent and Trademark Office*